United States Patent [19]
Fukatsu

[11] Patent Number: 6,028,403
[45] Date of Patent: Feb. 22, 2000

[54] VEHICLE CONTROL APPARATUS

[75] Inventor: Toshinari Fukatsu, Aichi-ken, Japan

[73] Assignee: Kabushiki Kaisha Toyoda Jidoshokki Seisakusho, Aichi-Ken, Japan

[21] Appl. No.: 09/170,928

[22] Filed: Oct. 13, 1998

[30] Foreign Application Priority Data

Oct. 29, 1997 [JP] Japan ..................... 9-296919

[51] Int. Cl.[7] ................................................ H02P 3/00
[52] U.S. Cl. ............................ 318/88; 318/34; 318/51; 318/63
[58] Field of Search ............................ 318/34, 38, 40, 318/51, 53, 63, 87, 88, 493

[56] References Cited

U.S. PATENT DOCUMENTS

| | | | |
|---|---|---|---|
| 3,828,233 | 8/1974 | Brulard | 318/87 |
| 3,881,141 | 4/1975 | Narita | 318/87 |
| 4,355,267 | 10/1982 | Franz, Jr. et al. | 318/89 |
| 4,453,111 | 6/1984 | Acker | 318/111 |
| 4,500,818 | 2/1985 | Konrad et al. | |

Primary Examiner—Bentsu Ro
Assistant Examiner—Rita Leykin
Attorney, Agent, or Firm—Morgan & Finnegan, L.L.P.

[57] ABSTRACT

The present invention provides a downsized vehicle control apparatus which is capable of controlling two DC separately excited motors. An armature of a first motor, an armature of a second motor and an armature chopper element for controlling the drive of the motors which is common to both of those motors are connected in series between the ends of a battery, and a drive circuit turns on/off the common armature chopper element for controlling the drive of the motors and a plurality of field chopper elements for the respective first and second motors to control the armature currents and the field currents in the first and second motors, respectively, thereby driving both of the motors with the desired rotational frequency or torque. The drive circuit controls the on/off operation of an armature chopper element for controlling regenerative braking which is connected in parallel to the series circuit consisting of the armature of the first motor and the armature of the second motor at the time of the regenerative braking to control a current flowing in the armatures of the first and second motors.

5 Claims, 3 Drawing Sheets

VEHICLE CONTROL APPARATUS

BACKGROUND OF THE INVENTION

1. Field of the Invention

The present invention relates to a vehicle control apparatus, and more particularly to a control apparatus for a vehicle which is driven using two DC separately excited motors.

2. Description of the Related Art

FIG. 2 schematically shows two-motor type three-wheelfork lift. The two-motor type three-wheel fork lift includes front wheels 1 and 2 which serve as drive wheels and one rear wheel 3 which serves as a steering wheel. The right and left front wheels 1 and 2 are coupled with first and second DC separately excited motors 6 and 7 through transmissions 4 and 5, respectively. The front wheels 1 and 2 are rotated at the same rotational frequency in the same direction, to thereby allow the vehicle to linearly travel forward or backward. Also, the rear wheel 3 is steered, and the right and left front wheels 1 and 2 are allowed to differ in the rotational frequency in accordance with a turning radius so that the vehicle can be turned. In particular, one of the front wheels which is at an inside of turning is rotated reversely with respect to the other outer front wheel, thereby being capable of reducing the turning radius.

The circuit structure of a conventional vehicle control apparatus that controls the drive of the above motors 6 and 7 for a, fork lift will be shown in FIG. 3. One end of a switch 12 is connected with a positive electrode of a battery 11, and an armature 13, an armature current detector 14 and an armature chopper element 15 for the first motor 6 are connected in series between the other end of the switch 12 and a negative electrode of the battery 11. A flywheel diode 16 is connected in parallel to the series circuit consisting of the armature 13 and the armature current detector 14. Also, a field current control circuit section 17 for the first motor 6 is connected between the other end of the switch 12 and the negative electrode of the battery 11. The field current control circuit section 17 is designed such that a series circuit consisting of first and second field chopper elements 18 and 19 and a series circuit consisting of third and fourth field chopper elements 20 and 21 are connected in parallel to each other. A field winding 22 and a field current detector 23 for the first motor 6 are connected in series between a node A of the first and second field chopper elements 18 and 19 and a node B of the third and fourth field chopper elements 20 and 21.

Similarly, an armature 24, an armature current detector 25 and an armature chopper element 26 for the second motor 7 are connected in series between the other end of the switch 12 and the negative electrode of the battery 11. A flywheel diode 27 is connected in parallel to the series circuit consisting of the armature 24 and the armature current detector 25. Also, a field current control circuit section 28 for the second motor 7 is connected between the other end of the switch 12 and the negative electrode of the battery 11. The field current control circuit section 28 is designed such that a series circuit consisting of first and second field chopper elements 29 and 30 and a series circuit consisting of third and fourth field chopper elements 31 and 32 are connected in parallel to each other. A field winding 33 and a field current detector 34 for the second motor 7 are connected in series between a node C of the first and second field chopper elements 29 and 30 and a node D of the third and fourth field chopper elements 31 and 32.

The respective gate terminals of the armature chopper element 15 and the first to fourth field chopper elements 18 to 21 of the field current control circuit section 17 for the first motor 6, and the armature chopper element 26 and the first to fourth field chopper elements 29 to 32 of the field current control circuit section 28 for the second motor 7 are connected to a drive circuit 35, respectively. The drive circuit 35 controls the armature current and the field current for the first motor 6 by turning on/off the armature chopper element 15 and the first to fourth field chopper elements 18 to 21, and also controls the armature current and the field current for the second motor 7 by turning on/off the armature chopper element 26 and the first to fourth field chopper elements 29 to 32.

However, as is apparent from FIG. 3, because the conventional vehicle control apparatus has a circuit structure in which a control circuit for controlling the drive of the first motor 6 and a control circuit for controlling the drive of the second motor 7 are connected in parallel to each other, there arises such a problem that the number of elements that constitutes the control apparatus, in particular, the number of elements for controlling a large current are large, and the entire vehicle control apparatus increases in size.

SUMMARY OF THE INVENTION

The present invention has been made in order to eliminate the above problems, and therefore an object of the present invention is to provide a downsized vehicle control apparatus which is capable of controlling two DC separately excited motors.

In order to achieve the above object, according to the present invention, there is provided a vehicle control apparatus for a vehicle which is driven using first and second DC separately excited motors, comprising: a battery; a first field current control circuit section connected between both ends of the battery and having a plurality of field chopper elements connected to the field winding of a first motor and a first field current detector connected in series to the field winding of the first motor; a second field current control circuit section connected between both ends of the battery and having a plurality of field chopper elements connected to the field winding of a second motor and a second field current detector connected in series to the field winding of the second motor; an armature current control circuit section having an armature for the first motor, an armature for the second motor, an armature current detector, a first armature chopper element for controlling the drive of the motors which is common to the first and second motors, and a second armature chopper element for controlling regenerative braking which is connected in parallel to the series circuit consisting of the armature of the first motor and the armature of the second motor being connected in series between both ends of the battery; and a drive circuit for controlling currents flowing in the field windings and armatures for the first and second motors by controlling the on/off operation of the respective field chopper elements of the first and second field current control circuit sections and the first armature chopper element on the basis of the detection signals inputted from the armature current detector and the first and second field current detectors, the drive circuit controlling the on/off operation of the second armature chopper element at the time of the regenerative braking to control a current flowing in the armatures of the first and second motors.

DETAILED DESCRIPTION OF THE PREFERRED EMBODIMENT

Now, a description will be given in more detail of a preferred embodiment of the present invention with reference to the accompanying drawings.

Figure 1:
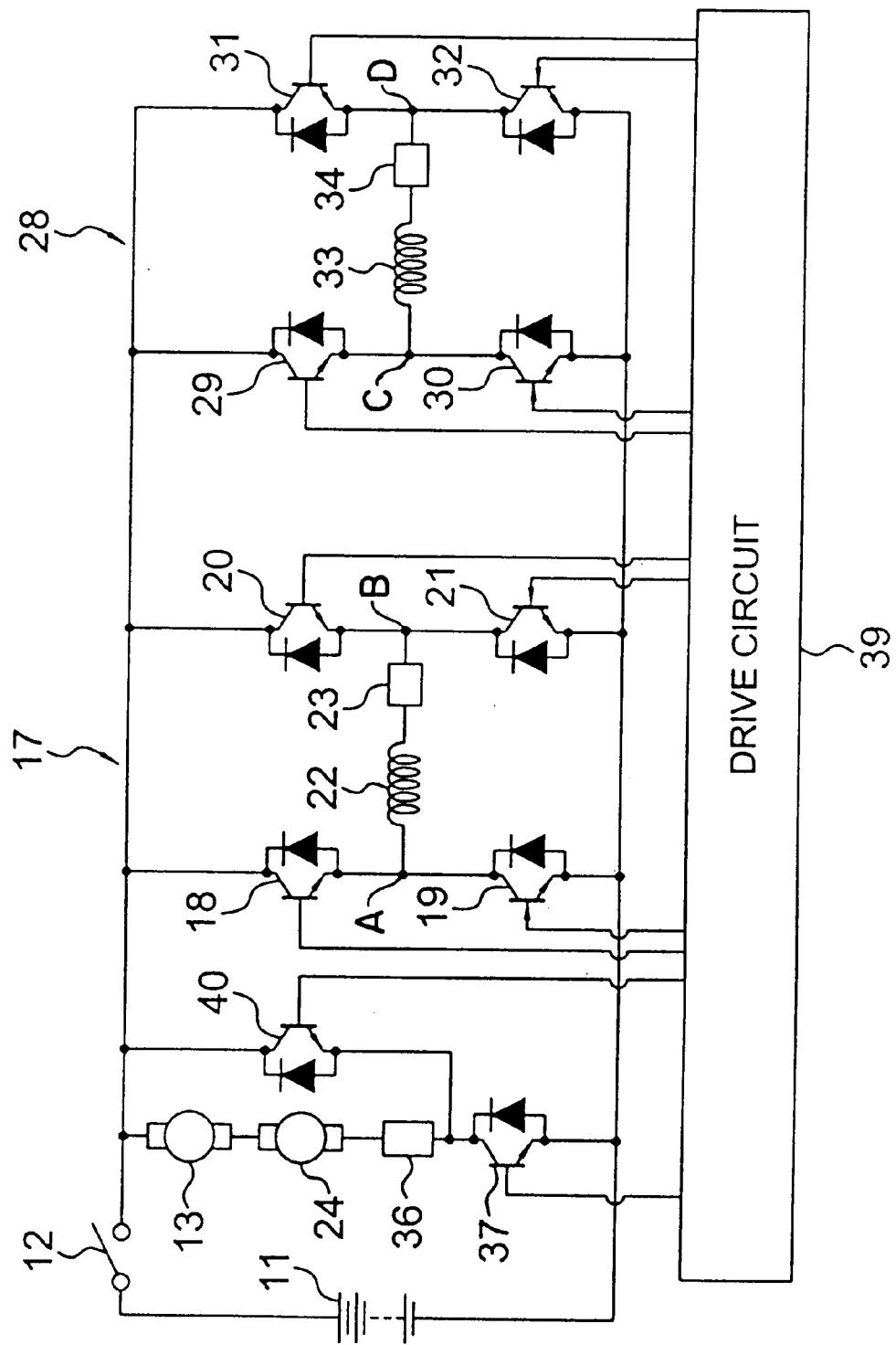
FIG. 1 is a circuit diagram showing a vehicle control apparatus in accordance with Embodiment 1 of the present invention.
Figure 2:
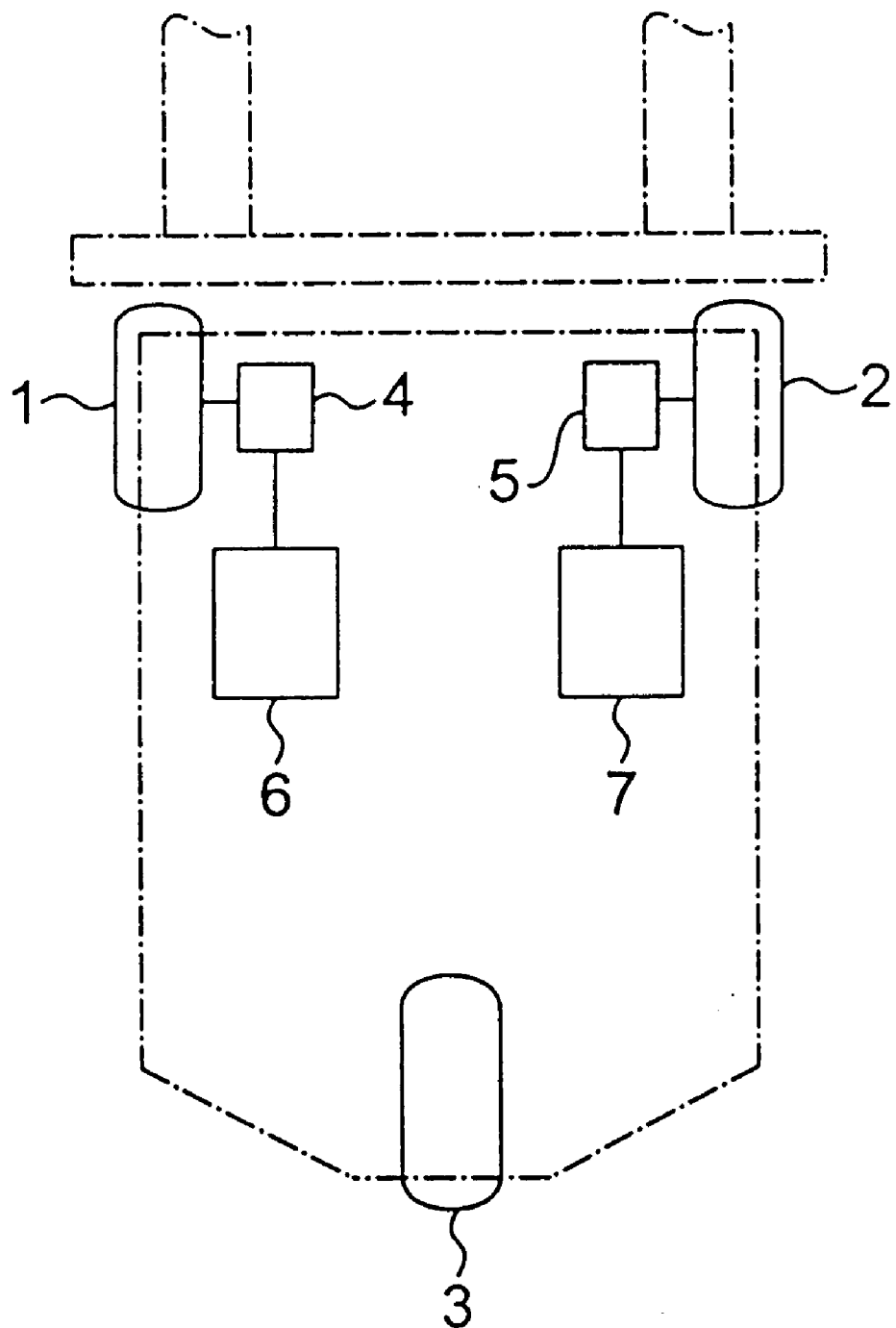
FIG. 2 is a plan view schematically showing a two-motor type three-wheel fork lift.

In FIG. 1, a vehicle control apparatus according to this embodiment of the present invention is directed to an apparatus for controlling the drive of first and second DC separately excited motors 6 and 7 which are coupled to right and left front wheels 1 and 2 through transmissions 4 and 5, respectively, as in a three-wheel fork lift shown in FIG. 2. One end of a switch 12 is connected with a positive electrode of a battery 11, and an armature 13 for a first motor 6, an armature 24 for a second motor 7, an armature current detector 36 and an armature chopper element 37 are connected in series between the other end of the switch 12 and a negative electrode of the battery 11. An armature chopper element 40 for controlling regenerative braking is connected in parallel to the series circuit consisting of the armatures 13, 24 and the armature current detector 36. The armature current detector 36, the armature chopper elements 37 and 40 are members common to the first motor 6 and the second motor 7, respectively.

Also, a field current control circuit section 17 for the first motor 6 is connected between the other end of the switch 12 and the negative electrode of the battery 11. The field current control circuit section 17 is designed such that a series circuit consisting of first and second field chopper elements 18 and 19 and a series circuit consisting of third and fourth field chopper elements 20 and 21 are connected in parallel to each other. A field winding 22 and a field current detector 23 for the first motor 6 are connected in series between a node A of the first and second field chopper elements 18 and 19 and a node B of the third and fourth field chopper elements 20 and 21.

Similarly, a field current control circuit section 28 for the second motor 7 is connected in series between the other end of the switch 12 and the negative electrode of the battery 11. The field current control circuit section 28 is designed such that a series circuit consisting of first and second field chopper elements 29 and 30 and a series circuit consisting of third and fourth field chopper elements 31 and 32 are connected in parallel to each other. A field winding 33 and a field current detector 34 for the second motor 7 are connected in series between a node C of the first and second field chopper elements 29 and 30 and a node D of the third and fourth field chopper elements 31 and 32.

In addition, a drive circuit 39 is connected to the respective gate terminals of the common chopper elements 37 and 40, and the respective field chopper elements 18 to 21 and 29 to 32 of the field current control circuit sections 17 and 28.

Figure 3:
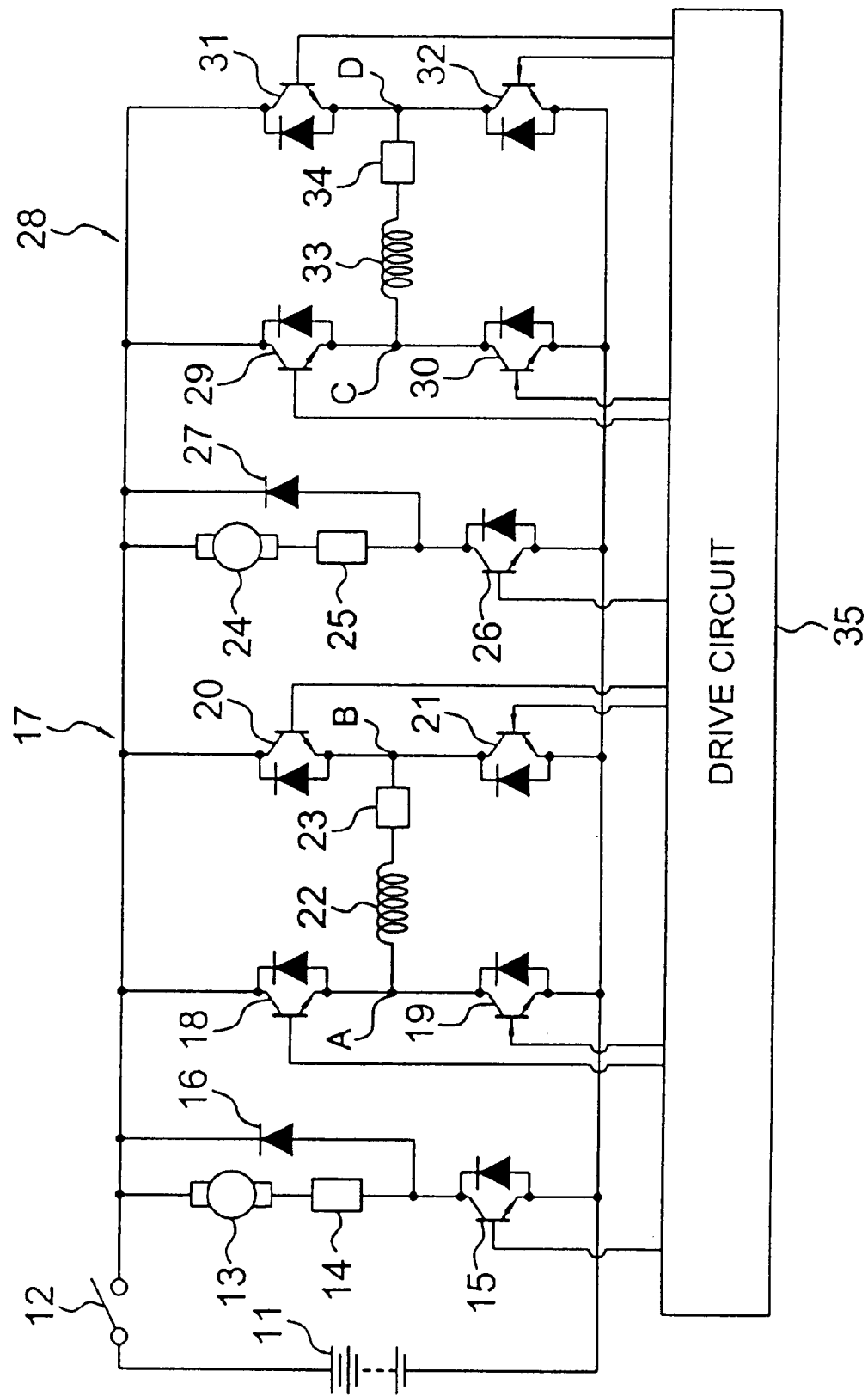
FIG. 3 is a circuit diagram showing a conventional vehicle control apparatus.

That is, the control apparatus according to Embodiment 1 is designed in such a manner that the armature 13 of the first motor 6 and the armature 24 of the second motor 7 are connected in series to each other, and the common armature current detector 36, armature chopper elements 37 and 40 are connected to those armatures 13 and 24, instead of the conventional vehicle control apparatus shown in FIG. 3 in which the armature current detector 14, armature chopper element 15 and flywheel diode 16 for controlling the armature 13 of the first motor 6, and the armature current detector 25, armature chopper element 26 and flywheel diode 27 for controlling the armature 24 of the second motor 7 are provided individually from each other.

Subsequently, the operation of the vehicle control apparatus will be described. First, an applied voltage across and a current flowing in the armature 13 of the first motor 6 and the armature 24 of the second motor 7 are controlled by turning on/off the common armature chopper element 37. When the armature chopper element 37 is on, a current flows into the battery 11 from the battery 11 through the armatures 13 and 24, the armature current detector 36 and the armature chopper element 37, whereas when the armature chopper element 37 is off, a current flows into the armatures 13 and 24 from the armatures 13 and 24 through the armature current detector 36 and the armature chopper element 40.

Also, a field developed by the field winding 22 of the first motor 6 and the field winding 33 of the second motor 7 is controlled by turning on/off the first to fourth field chopper elements 18 to 21 within the field current control circuit section 17 and the first to fourth field chopper elements 29 to 32 within the field current control circuit section 28. For example, in the case where a current is allowed to flow in the field winding 22 from the node A toward the node B, the first chopper element 18 within the field current control circuit section 17 is turned on, and the fourth field chopper element 21 is then turned on/off. When the fourth field chopper element 21 is on, a current flows into the battery 11 from the battery 11 through the first field chopper element 18, the field winding 22, the field current detector 23 and the fourth field chopper element 21. When the fourth field chopper element 21 is turned off, a current flows into the fielding winding 22 from the field winding 22 through the field current detector 23, the third field chopper element 20 and the first field chopper element 18 due to an inductance energy of the field winding 22.

The drive circuit 39 inputs detection signals from the armature current detector 36, and the field current detectors 23 and 34, respectively, to turn on/off the common armature chopper element 37 and the respective field chopper elements 18 to 21 and 29 to 32 within the field current control circuit sections 17 and 28, thereby controlling the armature current and the field current for the first motor 6 so that the first motor 6 is driven by the desired rotational frequency or torque, and also controlling the armature current and the field current for the second motor 7 so that the second motor 7 is driven by a desired rotational frequency or torque.

In this example, assuming that an applied voltage across the armature 13 is Va1, a current flowing in the armature 13 is Ia1, a resistance of the armature 13 is Ra1, a field current of the field winding 22 is If1, and a brush voltage drop is Vbu1 with respect to the first motor 6, a rotational frequency n1 [r.p.m.] of the first motor 6 is represented by the following expression:

$$n1 = (1/2\pi)\{(Va1 - Vbu1 - Ia1 \times Ra1)/K\phi1\} \times 60 \qquad (1)$$

where $K\phi1$ is a function of the field current If1.

Similarly, assuming that an applied voltage across the armature 24 is Va2, a current flowing in the armature 24 is Ia2, a resistance of the armature 24 is Ra2, a field current of the field winding 33 is If2, and a brush voltage drop is Vbu2 with respect to the second motor 7, a rotational frequency n2[r.p.m.] is represented by the following expression:

$$n2 = (1/2\pi)\{(Va2 - Vbu2 - Ia2 \times Ra2)/K\phi2\} \times 60 \qquad (2)$$

where $K\phi2$ is a function of the field current If2.

If motors with identical rating are employed as the first and second motors 6 and 7, since the armature voltage Va1, the armature current Ia1, the armature resistance Ra1, and the brush voltage drop Vbu1 with respect to the first motor 6 are equal to the armature voltage Va2, the armature current Ia2, the armature resistance Ra2, and the brush voltage drop Vbu2 with respect to the second motor 7, respectively, if the on/off operation of the field chopper elements 18 to 21 and 29 to 32 is controlled so that the field current If1 of the first motor 6 is identical with the field current If2 of the second motor 7, the functions K$\phi$1 and K$\phi$2 become equal to each other so that the rotational frequency n1 and n2 of both the motors 6 and 7 become equal to each other.

The torques T1 and T2 [Nm] of the first and second motors 6 and 7 are represented by the following expressions:

$$T1 = K\phi1 \times Ia1$$

$$T2 = K\phi2 \times Ia2$$

Therefore, when the rotational frequencies n1 and n2 of both the motors 6 and 7 are equal to each other, the torques T1 and T2 also become equal to each other. At the time when the vehicle starts to travel where the rotational frequencies n1 and n2 of both the motors 6 and 7 are 0, the first and second motors 6 and 7 coupled to the right and left front wheels 1 and 2, respectively, are driven by the same torque. Similarly, in the case where the vehicle travels linearly while the first and second motors 6 and 7 rotate with the same rotational frequency, both of the motors 6 and 7 are driven by the same torque.

Then, if the common armature chopper element 37 is turned on/off by the drive circuit 39 to adjust the armature current Ia1=Ia2, and also the respective field chopper elements 18 to 21 and 29 to 32 within the field current control circuit sections 17 and 28 are turned on/off to adjust the field currents If1 and If2, the rotational frequencies n1 and n2 of both the motors 6 and 7 can be set at desired values, respectively, on the basis of the above expressions (1) and (2). In the case where the vehicle is turned, the rotational frequencies n1 and n2 of both the motors 6 and 7 may be set so as to form the ratio of the rotational frequencies according to the turning radius.

In particular, when the turning radius satisfies that the rotational frequency of the inner wheel becomes 0, the field current of the motor coupled to the inner wheel is set at 0 so that the torque of the motor becomes 0. For example, if the field chopper elements 18 to 21 within the field current control circuit section 17 are controlled so that the field current If1 becomes 0 when the vehicle is turned counterclockwise, the torque of the first motor 6 coupled to the left front wheel 1 becomes 0, and the turn radius is obtained in response to this torque.

Similarly, if the flowing direction of the field current of the motor coupled to the inner wheel is set to be opposite to the flowing direction of the field current of the other motor coupled to the outer wheel under the control by the drive circuit 39, the inner wheel is reversely rotated so that the turning radius can be further reduced.

In this way, even if the armatures 13 and 24 of the first and second motors 6 and 7 are connected in series to each other so that control is made by the common armature chopper element 37, both of the motors 6 and 7 can be controlled.

In this embodiment, the drive circuit 39 controls the armature chopper element 37 on the basis of the armature currents of the armatures 13 and 24 which are detected by the armature current detector 36. Alternatively, the apparatus can be structured that voltages applied across the respective armatures 13 and 24 are detected by a voltage detector not shown so that armature chopper element 37 is controlled on the basis of the detected voltages.

When the first and second motors 6 and 7 which are being rotated are braked, the field chopper elements 18 to 21 and 29 to 32 are controlled by the drive circuit 39 to increase the field currents If1 and If2 of the field windings 22 and 33, thus turning off the armature chopper element 37, and also the armature chopper element 40 for controlling regenerative braking is turned on/off to control currents flowing in the armatures 13 and 24, thereby being capable of controlling the regenerative braking.

As was described above, since the vehicle control apparatus according to the present invention is structured in such a manner that the armatures of the first and second motors are controlled by the common armature chopper element, the number of elements that structures the apparatus is reduced, and the downsizing of the vehicle control apparatus is achieved.

Also, if the armature chopper element for controlling regenerative braking connected in parallel to the series circuit consisting of the armature of the first motor and the armature of the second motor is turned on/off by the drive circuit, the regenerative braking can be controlled.

What is claimed is:

1. A vehicle control apparatus for a vehicle which is driven using first and second separately excited DC motors, comprising:

a battery;

a first field current control circuit section connected between both ends of said battery and having a plurality of field chopper elements connected to the field winding of a first motor and a first field current detector connected in series to the field winding of the first motor;

a second field current control circuit section connected between both ends of said battery and having a plurality of field chopper elements connected to the field winding of a second motor and a second field current detector connected in series to the field winding of the second motor;

an armature current control circuit section connected between both ends of said battery having an armature for the first motor, an armature for the second motor, an armature current detector, a first armature chopper element for controlling the drive of the motors which is common to the first and second motors and a second armature chopper element for controlling regenerative braking which is connected in parallel to the series circuit consisting of the armature of the first motor the armature of the second motor and the armature current detector; and a drive circuit for controlling currents flowing in the field windings and armatures for the first and second motors by controlling the on/off operation of the respective field chopper elements of the first and second field current control circuit sections and the first armature chopper element on the basis of the detection signals inputted from said armature current detector and said first and second field current detectors, said drive circuit controlling the on/off operation of the second armature chopper element at the time of the regenerative braking to control a current flowing in the armatures of the first and second motors.

2. The vehicle control apparatus of claim 1 wherein the first and second motors are configured to drive and regeneratively brake first and second wheels of the vehicle, the wheels having a common axis of rotation.

3. The vehicle control apparatus of claim 2 wherein the field current control circuit section, armature current control circuit section and drive circuit are configured to independently control the driving and regenerative braking of the first and second wheels.

4. A vehicle control apparatus for a vehicle which is driven using first and second separately excited DC motors, comprising:

a battery;

a first field current control circuit section connected between both ends of said battery and having a plurality of field chopper elements connected to the field winding of a first motor and a first field current detector connected in series to the field winding of the first motor;

a second field current control circuit section connected between both ends of said battery and having a plurality of field chopper elements connected to the field winding of a second motor and a second field current detector connected in series to the field winding of the second motor;

an armature current control circuit section connected between both ends of said battery having an armature for the first motor, an armature for the second motor, an armature voltage detector, a first armature chopper element for controlling the drive of the motors which is common to the first and second motors and a second armature chopper element for controlling regenerative braking which is connected in parallel to the series circuit consisting of the armature of the first motor, the armature of the second motor and the armature voltage detector; and a drive circuit for controlling currents flowing in the field windings and armatures for the first and second motors by controlling the on/off operation of the respective field chopper elements of the first and second field current control circuit sections and the first armature chopper element on the basis of the detection signals inputted from said armature voltage detector and said first and second field current detectors, said drive circuit controlling the on/off operation of the second armature chopper element at the time of the regenerative braking to control a current flowing in the armatures of the first and second motors.

5. A vehicle control apparatus for a vehicle which is driven using first and second separately excited DC motors, each having an armature and a field winding, comprising:

a first field current control circuit section connectable across a DC excitation source and having a plurality of controlled field chopper elements connected to the field winding of the first motor and a first field current detector;

a second field current control circuit section connectable across the DC excitation source and having a plurality of controlled field chopper elements connected to the field winding of a second motor and a second field current detector;

an armature current control circuit section connectable across the DC excitation source and including the armatures of the first and second motors connected in series, an armature current detector, a first armature chopper element for controlling the current through the armature of the motors and a second armature chopper element for controlling regenerative braking which is connected in parallel to the series circuit consisting of the armature of the first motor, the armature of the second motor and the armature current detector; and a drive circuit for controlling currents flowing in the field windings and armatures of the first and second motors by controlling the on/off operation of the respective field chopper elements of the first and second field current control circuit sections and the first armature chopper element on the basis of the detection signals inputted from said armature current detector and said first and second field current detectors, said drive circuit controlling the on/off operation of the second armature chopper element at the time of the regenerative braking to control a current flowing in the armatures of the first and second motors.

* * * * *

UNITED STATES PATENT AND TRADEMARK OFFICE
CERTIFICATE OF CORRECTION

PATENT NO. : 6,028,403

DATED : February 22, 2000

INVENTOR(S) : Toshinari FUKATSU

It is certified that error appears in the above-identified patent and that said Letters Patent is hereby corrected as shown below:

On the Cover Page:

Item [56] References Cited
Add "Foreign Documents"
"2596254   12/1992   Japan"

Column 1, line 11, change "wheelfork" to --wheel fork--.

Column 1, line 28, change "a. fork lift" to --a fork lift--.

Column 6, line 51, change "motor the" to --motor, the--.

Signed and Sealed this

Tenth Day of April, 2001

*Attest:*

NICHOLAS P. GODICI

*Attesting Officer*   Acting Director of the United States Patent and Trademark Office